United States Patent [19]

Crum et al.

[11] 4,283,764
[45] Aug. 11, 1981

[54] MANUALLY PROGRAMMABLE ROBOT WITH POWER-ASSISTED MOTION DURING PROGRAMMING

[75] Inventors: Gerald W. Crum, Elyria; Brian M. Rooney, Amherst, both of Ohio

[73] Assignee: Nordson Corporation, Amherst, Ohio

[21] Appl. No.: 84,359

[22] Filed: Oct. 12, 1979

[51] Int. Cl.$^3$ .................. G05B 19/42; G06F 15/46
[52] U.S. Cl. ............................. 364/513; 318/568; 318/628; 364/120; 414/4
[58] Field of Search .............. 364/513, 474, 478, 120; 239/DIG. 14, 274; 318/568, 628; 414/1, 4, 5, 719, 729, 730, 744, 909, 787

[56] References Cited

U.S. PATENT DOCUMENTS

| | | | |
|---|---|---|---|
| Re. 28,437 | 6/1975 | Devol et al. | 364/513 X |
| 2,286,571 | 6/1942 | Pollard | 318/575 X |
| 3,241,687 | 3/1966 | Orloff | 414/5 |
| 3,280,991 | 10/1966 | Melton et al. | 414/5 |
| 3,422,965 | 1/1969 | Lloyd | 414/5 |
| 3,608,743 | 9/1971 | Mosher et al. | 414/5 |
| 3,648,143 | 3/1972 | Harper | 318/568 |
| 3,693,066 | 9/1972 | Friedman et al. | 318/628 X |
| 3,866,048 | 2/1975 | Gieschen et al. | 318/628 X |
| 3,904,042 | 9/1975 | Colston | 414/1 |
| 3,923,166 | 12/1975 | Fletcher et al. | 414/4 |
| 3,948,093 | 4/1976 | Folchi | 73/133 R |
| 4,030,617 | 6/1977 | Richter | 414/4 |
| 4,107,590 | 8/1978 | Pury et al. | 318/628 |
| 4,115,684 | 9/1978 | Lindbom | 318/568 X |

Primary Examiner—Joseph F. Ruggiero
Attorney, Agent, or Firm—Wood, Herron & Evans

[57] ABSTRACT

A robot is disclosed having a plurality of movable links interconnected end-to-end in series. Associated with each is an actuator and position transducer. Some of the links are relatively massive and cannot be readily moved without power assistance when the robot is manually programmed, while other links, namely those constituting the wrist, are relatively lightweight which permits movement thereof without power assistance during manual programming. A force transducer is connected in series with the output element of the robot in association with one of the massive links located between the wrist and the stationary base on which the robot is mounted. The transducer senses forces during programming applied to the massive links via the wrist when manual programming forces are applied to the robot output. The force transducer provides an output signal for each of the massive links correlated to the component of the manual programming force transmitted thereto via the wrist. During programming, the force transducer output signals are applied to the actuators of their respectively associated massive links to move the massive links in power-assisted fashion, while the lightweight links of the wrist move in unpowered fashion in response to the manual force applied thereto during programming. The power-assisted motion provided to the massive links by their respectively associated actuators, coupled with the unpowered motion of the lightweight links constituting the wrist, collectively produce motion of the robot output element in the direction to which the manual force is applied thereto during manual programming.

23 Claims, 7 Drawing Figures

MANUALLY PROGRAMMABLE ROBOT WITH POWER-ASSISTED MOTION DURING PROGRAMMING

This invention relates to programmable robots, and more particularly to programmable robots having power-assisted motion during manual programming.

Programmable robots have been used for many years to execute, on a repetitive basis, relatively complex motions which the robot has been "trained", or "programmed", to do. Typically, the robot consists of a plurality of interconnected links or members. At each interconnection point, or joint, an actuator and associated position transducer is located. By applying a series of suitable electrical motion control signals to the actuators, which have been prerecorded during the programming or training phase, the links can be moved relative to each other to accomplish the desired series of motions.

The position transducers continuously provide signals indicating the relative positions of the respective robot links. During program execution, the position transducer outputs are incorporated in closed loop servo controls for assuring that the various links execute the desired, or programmed, motion dictated by the stored motion control signals. During programming, the outputs of the position transducers associated with the various robot links are recorded such that they can later be reproduced and applied to their respectively associated servo position loops to execute the previously taught motion.

In the past, movement of the robot links during programming, or teaching, was typically accomplished in one of several ways. With one approach, a joystick is used to control the actuators during programming such that the robot links move to position the robot output element in accordance with manual manipulation of the joystick. A disadvantage of this approach is that training of the robot is not accomplished by manually moving the robot output element, which might have mounted to it a spray gun or the like, but rather is accomplished by moving a joystick. While a skilled spray painter can move a spray gun in the desired pattern to accomplish spray coating an object, that same spray painter is not likely to be able to effectively control the motion of a spray gun mounted at the end of a robot utilizing a joystick. Hence, the robot cannot readily be programmed to spray paint by a spray painter, but rather can only be programmed by one possessing relatively specialized skills not typically possessed by a spray painter.

A second approach to robot programming, or training, involves utilization of an additional, lightweight "training robot" which, except for the mass of the "training robot" and the absence of actuators for the links, is identical in all respects to the considerably more massive "working robot" being programmed. To program the "working robot", the output element of the "training robot" is grasped manually by the individual doing the programming and moved through a sequence of motions which it is desired to have the "working robot" subsequently execute. Since the "training robot" is lightweight, it can be moved manually by the operator with little difficulty. As the "training robot" is being moved through the desired sequence of motions, position transducers at the joints of its links provide electrical signals which are recorded for subsequent reproduction and input to the actuator servo loops of the "working robot". Thus, during programming, the "working robot" is at rest. Similarly, during execution of the programmed steps by the "working robot", the "training robot" is at rest. The obvious disadvantage of utilizing a "training robot" is that a separate robot structure, albeit one which is lightweight and has no actuators, is required which serves no useful purpose except during programming. This unnecessarily adds to the cost of the system, and involves either a position offset or a mechanical changeover at the location of the robot; removing one and replacing it with the other.

A third approach to training a robot involves the provision of actuator-controlling electrical switches at the robot joints. The switches are responsive to slight movement of the robot links when the operator physically grips the output element of the robot during programming and attempts to move it through the desired sequence of motions. As the programmer attempts to manually move the robot output element during programming, there is some slight motion of the robot links which is sensed at the joints by the electrical switches thereat. The switches respond to energize their respectively associated actuators, moving the links in the direction of the manual force transmitted to the joints by robot links as an incident to programming. In accordance with this scheme, the switch-operated actuators are either energized or de-energized during robot programming, with the result that the robot responds in a very jerky fashion. While this approach has been described in the patent literature for many years, it has never been sufficiently satisfactory to be commercialized to any significant extent.

A fourth method involves bypassing or decoupling of the actuators and counterbalancing the robot so that the operator may more easily move it through the desired path. The inertia of the robot remains and even in a lightweight machine is a substantial quantity and restricts free motion greatly.

Accordingly, it has been an objective of this invention to provide a trainable robot which responds to manual forces applied to the robot output element during training to produce smooth robot motions and do so without the need for a joystick control, a specially designed lightweight auxiliary training robot, or means to decouple the actuators and counterbalance the robot links. This objective has been accomplished in accordance with certain of the principles of this invention by providing, in combination with a robot having plural series connected links interconnected at joints having associated actuators and position transducers, some of which links are relatively lightweight such as those making up the wrist and others of which are relatively massive such as those interconnecting the wrist and the stationary base, plural force transducers which are responsive to the forces transmitted to the massive links via the wrist as the output element of the robot is manually urged along the desired path, and applying the outputs of the force transducers to their respectively associated actuators to provide power-assisted motion of the massive links in the direction of the manual force components transmitted thereto. The power-assisted motion of the massive links, coupled with the unpowered motions of the lightweight links comprising the wrist, are due solely to the manual force applied to the robot output element by the programmer, collectively move the output element of the robot along the path it is urged by the manual force applied thereto by the programmer. The output signals of these force transducers responding to nonvertical manual programming force components are compensated for inertial force effects of the lightweight arms located outboard of the force transducers. The output signals of force transducers which respond to vertical programming force components are compensated for gravitational force effects of the outboard wrist, as well as for inertial force effects.

An important advantage of this invention, particularly attributable to locating the force transducers between the lightweight links of the wrist and the massive links inboard of the wrist is that the force transducer output need not be adjusted for varying orientation of the wrist which would otherwise be necessary were the force transducers located at the robot output element, that is, outboard of the wrist.

A still further advantage of the robot of this invention is that the force transducers are in series with the robot links. As such, the force transducers respond to the net force applied to the output element of the robot. Since the force transducers do respond to the net force applied to the output end of the robot, if the programmer were to stumble and fall and in doing so pull the robot output against his body, the force applied to the programmer's body by the power-assisted links could not exceed the force which the programmer himself applies to the output of the robot.

A further advantage of placement of the force transducers in series with the robot links is that during execution of the programmed steps the forces in the robot links can be monitored, and if they exceed a predetermined safety threshold level, the robot can be shut down and/or a suitable alarm provided.

If desired the "feel" of the robot during manual programming, that is, its response to manual programming forces as subjectively determined by the programmer, can be enhanced by further compensation of the force transducer outputs. Specifically, the force transducer outputs can be modified in accordance with the third derivative with respect to time of the displacement of the wrist.

These and other features, advantages, and objectives of the invention will become more readily apparent from a detailed description of the robot taken in conjunction with the drawings in which.

Figure 1:
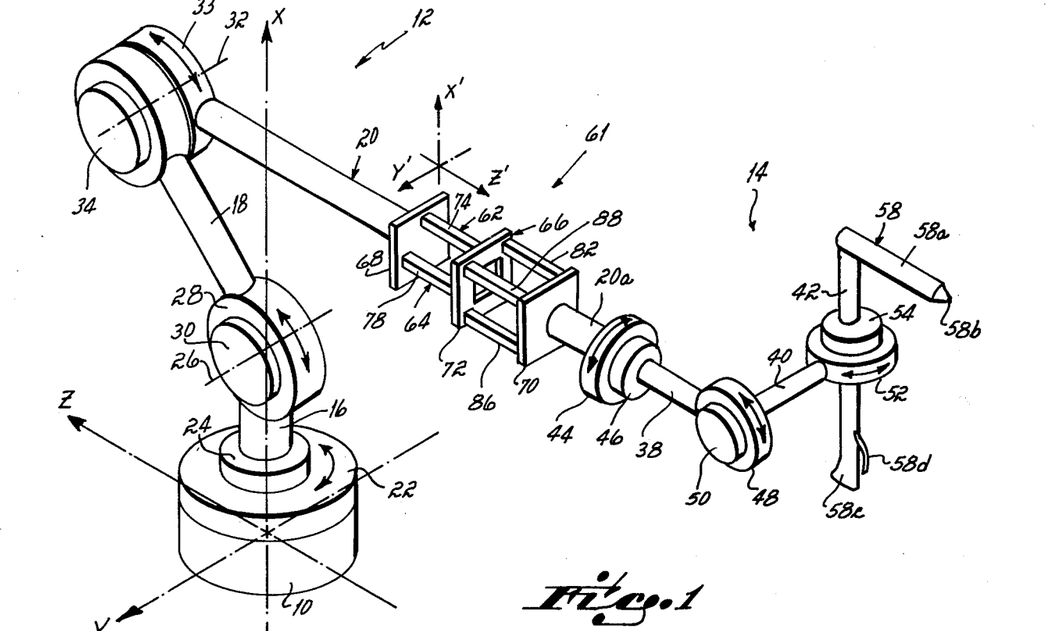
FIG. 1 is a perspective view in schematic form of the robot of this invention showing the general relationship of the robot links, actuators, and position transducers.

With reference to FIG. 1, a preferred form of the robot of this invention is seen to include a base 10 which rests on the floor or other appropriate surface for supporting the robot. Extending from the base 10 are plural series-connected elongated articulated members 12 of relatively large mass which provide the robot with several degrees of freedom, and plural series-connected elongated articulated members 14 of relatively small mass which provide the robot with several additional degrees of freedom. In the preferred embodiment the series of articulated members 12 and 14 collectively provide the robot with a total of six degrees of freedom.

The series of articulated members 12 include a pedestal 16, an upper arm or link 18, and forearm or link 20, all of which are relatively massive structural members fabricated of steel or some other suitable material exhibiting high strength. Typically, the pedestal 16 and the links 18 and 20 each approximate 1-3 feet in length and weigh in the range of 50-400 lbs. The pedestal 16 is vertically disposed and mounted to the base 10 by a suitable joint which permits the pedestal to rotate about its longitudinal axis which is coincident with the X axis. An actuator 22 is associated with the pedestal 16, and is responsive to a position command signal to facilitate selective bidirectional angular motion of the pedestal 16 in an azimuthal direction about its longitudinal axis. Also associated with the pedestal 16 is a position transducer 24 which provides an electrical signal correlated to the angular, or azimuthal, position of the pedestal 16 relative to the base 10.

The link 18 at its inner end is connected to the upper end of the pedestal 16 by a suitable joint for permitting pivotal, elevational movement of the link in a vertical plane about a horizontal axis 26 which is perpendicular to the X axis and parallel to the Y—Z plane. Associated with the link 18 is an actuator 28 which is responsive to a position command signal and facilitates selective bidirectional elevational pivotal movement of the link about horizontal axis 26. Also associated with the link 18 is a position transducer 30 which provides an electrical signal correlated to the elevational position of the link relative to the pedestal 16.

The link 20 at its inner end is connected to the outer end of the link 18 by a suitable joint for permitting the link 20 to move in a vertical plane about horizontal axis 32 which is parallel to axis 26. A suitable transducer 34 is associated with the link 20 for providing an electrical output signal correlated to the angular elevational position of the link 20 with respect to the link 18. An actuator 33 is associated with the link 20 which is responsive to a position command signal and facilitates selective bidirectional elevational pivotal movement of the link 18 about horizontal axis 32.

The actuator 24 which bidirectionally drives the pedestal 16 about the X axis provides the robot with one degree of freedom, namely, azimuthal positioning motion, while the actuators 28 and 33 which bidirectionally drive the link 18 and link 20, respectively, provide the robot with two degrees of freedom, each in an elevational direction.

The articulated members 14, which collectively constitute a wrist, include series-connected arms, links, or members 38, 40 and 42. Link 38 at its inner end is connected via a suitable joint to the outer end 20a of the link 20. An actuator 44 is associated with the wrist member 38 for bidirectionally rotating the wrist member 38 about its longitudinal axis which is coincident with the longitudinal axis of the link 20. A suitable position transducer 46 is associated with the wrist member 38 for providing an electrical signal correlated to the relative rotational position of the wrist member 38 with respect to the link 20.

The wrist member 40 is connected at its inner end via a suitable joint to the outer end of the wrist member 38 for providing rotational movement of member 40 about its longitudinal axis which is perpendicular to the longitudinal axis of member 28. An actuator 48 is associated with wrist member 40 for bidirectionally rotating wrist member 40 about its longitudinal axis perpendicular to the longitudinal axis of wrist member 38. A suitable position transducer 50 is also associated with wrist member 40 for providing an electrical output correlated to the rotational position of wrist member 40 relative to wrist member 38.

Wrist member 42 is connected via a suitable joint to the outer end of wrist member 40 to facilitate rotation of member 42 about its longitudinal axis which is disposed perpendicularly to the longitudinal axis of wrist member 40. An actuator 52 associated with wrist member 42 facilitates bidirectional motion of the member 42 about its longitudinal axis. A transducer 54, also associated with wrist member 42, provides an electrical signal output correlated to the relative rotational position of wrist member 42 relative to wrist member 40.

Wrist member 42 constitutes the mechanical output element of the robot. While the mechanical output of the robot can be utilized for positioning a wide variety of devices, in the preferred form of the invention the robot is utilized to position a spray coating gun 58. The barrel 58a of the spray coating gun, which has a nozzle 58b which emits coating particles, is connected at its rearward end to the upper end of the wrist member 42. The lower end of the wrist member 42 has secured to it a handle member 58c which can be grasped by an operator during manual programming of the robot in a manner to be described hereafter. The handle 58c together with the barrel 58a closely approximates the structure of a conventional manually operated spray gun. The handle 58c mounts a suitable trigger mechanism 58d which, when actuated during manual programming, functions to control and program the emission of coating particles from the nozzle 58b of the spray gun 58.

The longitudinal rotational axes of wrist members 38, 40 and 42 are mutually perpendicular, and accordingly constitute three degrees of freedom for the robot. The three degrees of freedom of the wrist 14, coupled with the three degrees of freedom on the pedestal 16 and links 18 and 20, provide a total of six degrees of freedom for the robot.

The wrist members 38, 40 and 42, as well as their associated actuators 44, 48 and 52 and transducers 46, 50 and 54, are relatively lightweight, for example, in practice not weighing more than approximately 15–25 lbs., exclusive of the gun 58 which weighs approximately 2 lbs. As a consequence, when the handle 58c of the gun 58 is grasped by the user during manual programming for the purpose of moving the gun through the desired sequence of motions it is desired to have the robot repetitively execute thereafter under program control, the wrist members 38, 40 and 42 will move without power assistance under the action of the manual force applied by the operator to the handle of the spray gun. However, due to the substantial mass of the pedestal 16, link 18, and link 20, these series-connected articulated members will not move without power assistance in response to forces transmitted to the outer end 20a of link 20 via the wrist 14 pursuant to the application of manual force to the handle 58c by the operator during programming.

With respect to the output of the robot constituted by wrist member 42 to which the gun 58 is connected, the pedestal 16, link 18, and link 20 and their associated actuators 22, 28 and 33 can be considered to effectively provide linear motion in three mutually perpendicular directions parallel to the Y, Z, and X axes, respectively. Specifically, with respect to gun 58 rotational motion imparted to pedestal 16 about the X axis provided by the actuator 22 effectively imparts lateral motion to the gun 58 parallel to the Y axis. Elevational movement of the link 18 about axis 26 provided by actuator 28 effectively imparts in/out, or horizontal, motion to the gun 58 parallel to the Z axis. Finally, elevational motion of link 20 provided by actuator 33 effectively imparts up/down, or vertical, movement to the gun 58 parallel to the X axis. Thus, as viewed by the gun 58, rotary actuators 22, 28, and 33 effectively impart linear motion to the gun 58 in three mutually perpendicular directions parallel to the mutually perpendicular Y, Z, and X axes, respectively.

Similarly, when the operator grasps handle 58c and applies a manual force to it in some arbitrary direction to move the gun along a prescribed path, the force applied by the operator to the gun can be resolved into force components parallel to the X, Y, and Z axes. Since the manual force applied to the gun during programming is transmitted via the wrist 14 to the outer end 20a of the link 20, the programming force transmitted to the outer end of the link 20 likewise can be resolved into force components parallel to the X', Y', and Z' axes of the link 20. Manual programming force transmitted to the link 20 in the Y' direction tends to rotate the pedestal 16 about its longitudinal X axis. By sensing the manual programming force component applied to the link 20 in the Y' direction a control signal can be generated for operating the actuator 22 associated with the pedestal 16 to provide power-assisted rotation of the pedestal 16 in the desired direction about its longitudinal axis. Similarly, by measuring the manual program force component applied via the wrist 14 to the link 20 in the Z' direction, a control signal can be developed for input to the actuator 28 to provide power-assisted pivoting of the link 18 about its axis 26 in the desired direction. Finally, by measuring the manual programming force applied by the wrist 14 to the link 20 in the X' direction, a control signal can be developed for input to actuator 33 to provide power-assisted pivoting of the link 20 about its horizontal axis 32 in the desired direction. Thus, these control signals applied to actuators 22, 28 and 33 as a consequence of sensing manual programming force components transmitted via wrist 14 to link 20 in the Y', Z', and X' directions, respectively, can be utilized to provide power-assisted motion of the pedestal 16, link 18, and link 20 during manual programming. The power-assisted motion of the pedestal 16, link 18, and link 20, together with the unpowered motion of the wrist members 38, 40, and 42 as a consequence solely of the manual force applied thereto during programming, collectively permit the gun 58 to be moved in the direction to which manual force is applied to the gun handle 58c during programming.

To measure the manual programming force components applied via the wrist 14 to the link 20 in the X', Y', and Z' directions, a multi-axis force transducer assembly 61, which includes three separate force transducers 62, 64, and 66, is mounted in series with the link 20. The force transducer 62 senses the manual programming force component transmitted to the link 20 via the wrist 14 in the X' direction, while the force transducers 64 and 66 sense the manual programming force components transmitted via the wrist 14 to the link 20 in the Y' and Z' directions, respectively.

Figure 2:
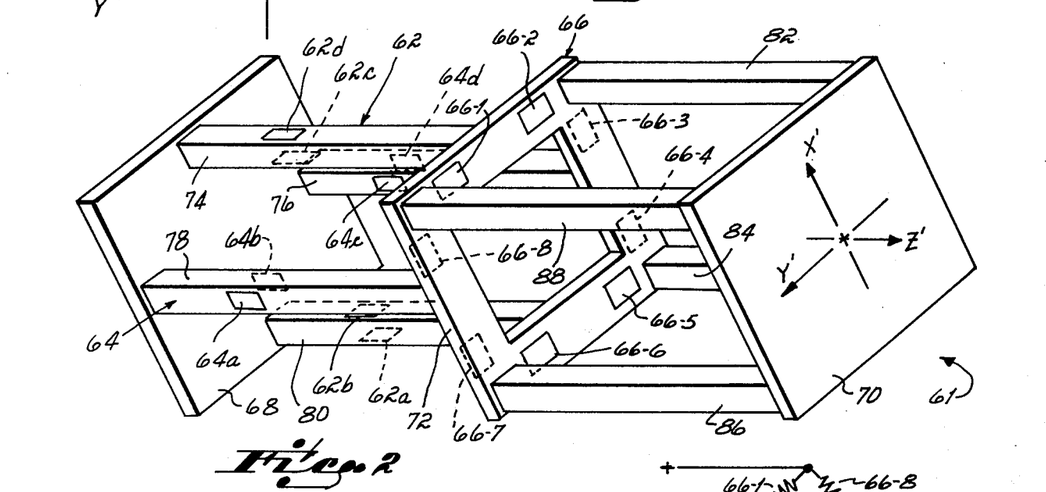
FIG. 2 is a perspective view in schematic form of the force transducers.

As best seen in FIG. 2, the force transducer assembly 61, which is serially connected in link 20, includes spaced parallel end plates 68 and 70 between which is positioned, in parallel disposition thereto, a central apertured plate 72. Interconnecting the end plate 68 and the central plate 72 are a series of four parallel beams 74, 76, 78, and 80. The beams 74, 76, 78, and 80 interconnect the plates 68 and 72 at peripheral points thereof located midway between the corners of the plates. The beams 74, 76, 78, and 80 are of equal length and cross-section. The plates 72 and 70 are interconnected at the corners thereof by parallel beams 82, 84, 86, and 88, which are also of equal length and cross-section.

Figure 3A:
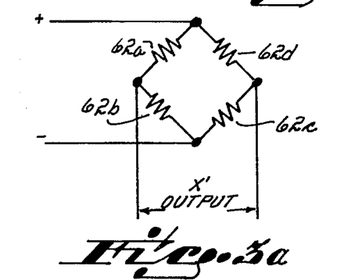
FIGS. 3a, 3b, and 3c are circuit diagrams of the electrical bridges in which the force transducers are connected for the X', Y', and Z' directions, respectively.

To facilitate sensing of shear force present in the link 20 attributable to manual programming force components in the X' direction transmitted thereto from gun 58 via wrist 14, four resistive strain gauges 62a, 62b, 62c, and 62d are fastened to the beams 74 and 80. Specifically, strain gauges 62a and 62b are secured to the lower and upper surfaces, respectively, of beam 80, while strain gauges 62c and 62d are fastened to the lower and upper surfaces, respectively, of beam 74. The strain gauges 62a, 62b, 62c, and 62d are interconnected in a d.c. bridge as shown in FIG. 3a. As a consequence of the location of the strain gauges 62a, 62b, 62c, and 62d on beams 74 and 80 as shown in FIG. 2 and their manner of interconnection in the bridge of FIG. 3a, the X' output of the bridge is correlated to the manual programming force component in the X' direction transmitted via the wrist 14 to the link 20.

The X' output of the bridge of FIG. 3a, in a manner to be described hereafter, is compensated for both gravitational force effects of the wrist as well as inertial force effects of the wrist. The X' output, after the aforesaid inertial and gravitational compensation, is input to the actuator 33 which causes the link 20 to be moved vertically, either up or down depending upon the direction of the manual programming force applied to the spray gun 58, in an effort to reduce to zero the force in the link 20 in the X' direction. Thus, due to the application of a manual programming force to the spray gun 58 having a component in the X' direction, the link 20 is moved by its associated actuator 33 in the X direction, thereby providing power-assisted movement of the gun in the X direction.

Figures 3B, 3C:
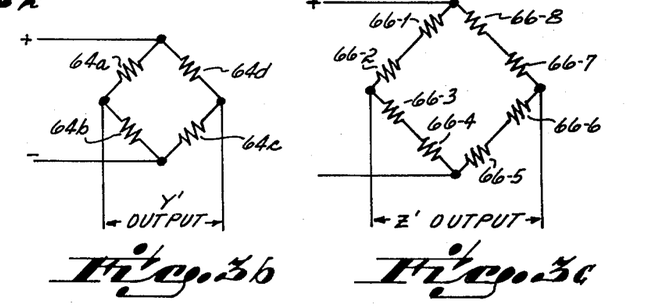

To sense the shear force existing in the link 20 in the Y' direction as a result of the transmission thereto by the wrist 14 of the component of manual programming force applied to the gun 58 in the Y' direction, four resistive strain gauges 64a, 64b, 64c, and 64d are utilized. Strain gauges 64a and 64b are mounted on the outer and inner vertical faces of the beam 78, and strain gauges 64c and 64d are mounted on the inner and outer vertical faces of the beam 76. The strain gauges 64a, 64b, 64c, and 64d are connected in legs of a d.c. bridge in the manner shown in FIG. 3b. By reason of the specific placement of the strain gauges 64a, 64b, 64c, and 64d on the beams 76 and 78 as shown in FIG. 2, and the interconnection thereof in the bridge as shown in FIG. 3b, the Y' output signal of the bridge is correlated to the shear force existing in the link 20 attributable to the manual programming force component in the Y' direction transmitted thereto from gun 58 via the wrist 14. In operation, the Y' output from the bridge of FIG. 3b, after suitable compensation for inertial force effects of the wrist 14, is applied to the actuator 22 to move the gun in power-assisted fashion in the Y direction in accordance with the manual programming force component in the Y' direction applied to the gun 58.

To measure the shear force in the link 20 in the Z' direction induced by the transmission thereto via the wrist 14 of the manual programming force component in the Z' direction applied to the gun 58, resistive strain gauges 66-1, 66-2, . . . 66-8 are utilized. Strain gauges 66-1 and 66-2 are fastened to the righthand vertical face of the upper horizontal portion of the central plate 72 between the midpoint and corners thereof. Strain gauges 66-5 and 66-6 are secured to the right-hand vertical face of the lower horizontal portion of the central plate 72 on either side of the midpoint thereof. Strain gauges 66-3 and 66-4 are secured to the left vertical face of the rear vertical portion of the plate 72 on either side of the midpoint thereof. Strain gauges 66-7 and 66-8 are secured to the left vertical face of the front vertical portion of plate 72 on either side of the midpoint thereof. The strain gauges 66-1, 66-2, . . . 66-8 are connected in the legs of a d.c. bridge as shown in FIG. 3c. With the location of the strain gauges 66-1, 66-2, . . . 66-8 on the plate 72 as shown in FIG. 2 and their interconnection in the bridge as shown in FIG. 3c, the Z' output of the bridge is correlated to the component of manual programming force applied via the wrist 14 to the link 20 in the Z' direction by the gun 58. The Z' output, in use, is applied to the actuator 28 to move the link 18 in power-assisted fashion in a manner such that the gun 58 moves in accordance with the manual programming force applied to the gun in the Z' direction.

The power-assisted motions of the pedestal 16, link 18, and link 20 during programming coupled with the unpowered motions of the wrist members 38, 40, and 42 induced solely by manual forces applied to the gun, collectively function to move the gun 58 in the sequence of arbitrary directions which the operator by the application of manual force thereto programs the robot.

The wrist weight, or gravitational force acting on the wrist mass, will induce strains in the link 20 in the X' and Z' directions during programming, program execution, and when the robot is at rest. These gravitational force induced strains in turn will provide finite X' and Z' output components from the force transducer bridges of FIGS. 3a and 3c. Since these X' and Z' output components of bridges of FIGS. 3a and 3c are attributable solely to the weight of the wrist 14, and not to manual programming force components in the X' and Z' direction transmitted to the link 20 via the wrist 14 as the result of the application of manual programming forces of gun 58, it is desirable to compensate the X' and Z' outputs of the bridges of FIGS. 3a and 3c for the gravitational force acting on the wrist mass, i.e., the weight of the wrist 14. Such compensation is achieved by cancelling, or nulling, that portion of component of the X' and Z' output of the bridges of FIGS. 3a and 3c which is attributable to the gravitational force acting on the mass of the wrist 14.

Gravitational force nulling of the X' (Z') output of the bridge of FIG. 3a (3c) for wrist mass is accomplished by subtracting from the X' (Z') output of the bridge of FIG. 3a (3c) a signal component having a magnitude such that the X' (Z') output will be zero when the wrist 14 is at rest and no programming force is applied thereto in the X' (Z') direction. Since the gravitational force acting on the mass of the wrist 14 in the X' (Z') direction as sensed by the X' (Z') force transducer 62 (66) will vary with the elevation of the link 20, the magnitude of the signal component of the X' (Z') output of bridge of FIG. 3a (3c) which is subtracted to cancel the gravitational force acting on the mass of the wrist 14 in the X' (Z') direction will vary as a function of the cosine (sine) of the elevational angle which the link 20 makes with the horizontal. If the link 20 is in a vertical position, the weight of the wrist 14 as sensed by the X' (Z') force transducer 62 (66) is zero (maximum), and a zero (maximum) magnitude nulling signal is subtracted from the X' (Z') output of the bridge of FIG. 3a (3c). If the link 20 is horizontally disposed the weight of the wrist 14 as sensed by the X' (Z') transducer 62 (66) is maximum (minimum), and the maximum (minimum) X' (Z') wrist gravitational force nulling component is subtracted from the X' (Z') output of the bridge of FIG. 3a (3c).

The output of force transducer 64 is input to the actuator 22 to provide power-assisted motion in the lateral, or Y', direction during programming. Since the gravitational force acting on the mass of the wrist 14 does not induce any strain in the link 20 in the Y' direction, the Y' output of the force transducer 64 does not have to be compensated for the wrist weight, i.e., for gravitational force acting on the mass of the wrist.

When the velocity of the wrist 14 changes in the X', Y', and Z' directions, the wrist applies forces to the link 20 due to acceleration-induced inertial forces acting on the wrist. These inertial force components in the X', Y', and Z' direction applied to the link 20 when the wrist velocity changes in the X', Y', and Z' directions is sensed by the X', Y', and Z' force transducers 62, 64, and 66. As a consequence, a component of the X', Y', and Z' outputs of the bridges of FIGS. 3a, 3b, and 3c is attributable to the inertial force caused by acceleration of the wrist. The wrist inertial force components of the outputs of the X', Y', and Z' bridges are totally independent of, and in addition to, any components of the X', Y', and Z' bridge outputs attributable to manual programming force components in the X', Y', and Z' directions applied to the link 20 via the wrist as a consequence of manual programming forces applied to the gun 58. Accordingly, it is desirable to compensate, cancel, or null, the component of the X', Y', and Z' bridge outputs attributable solely to inertial force caused by acceleration of the wrist 14. This is achieved by subtracting from the X', Y', and Z' bridge outputs, signals having magnitudes correlated to the forces applied to the link 20 by the wrist in the X', Y', and Z' directions due solely to changing wrist velocity components in the X', Y', and Z' directions, respectively.

In summary, the X' and Z' outputs of the X' and Z' bridges 62 and 66 are compensated for both the gravitational force on the wrist mass as well as the inertial force caused by acceleration of the wrist, while the Y' output of the bridge 64 is compensated only for inertial force caused by acceleration of the wrist.

To program the robot, the outputs of the transducers 24, 30, 34, 46, 50, and 54 are connected to a suitable recording device. Additionally, the outputs of the X', Y', and Z' force transducers, after suitable compensation for inertial force and/or gravitational force effects attributable to the wrist 14, are connected to the actuators 33, 22, and 28, respectively. The actuators 44, 48, and 54 associated with wrist members 38, 40, and 42 are not provided with any inputs. Additionally, if electrohydraulic actuators are used for the wrist members, the hydraulic input and output of each actuator are hydraulically short-circuited to minimize the internal hydraulic resistance of the actuator.

With the foregoing accomplished, the operator grasps the handle 58c of the gun 58 and proceeds to move the gun in the direction and through the sequence of motions desired. Due to the relatively low mass and lightweight nature of the wrist members 38, 40, and 42, the forces manually applied by the operator to the gun 58 during programming are sufficient to move the wrist members in the desired manner.

Movement of the wrist members 38, 40, and 42 during programming is attributable to torques resulting from forces applied to the gun by the operator. For example, a torque applied to the gun handle 58c to rotate it about the longitudinal axis of the gun handle will be operative to rotate the actuator 54 about its longitudinal axis. Similarly, a force applied to the gun handle 58c in a direction perpendicular to a plane containing the handle 58c and member 40 produces a torque which will be effective to rotate the wrist member 40 about its longitudinal axis. A force applied by the operator to the gun handle 58c in a direction parallel to the longitudinal axis of the gun handle produces a torque which is effective to rotate the wrist member 38 about its longitudinal axis.

Manual programming forces applied to the handle 58c such that the gun is constrained to move solely in a vertical direction are transmitted by the wrist members 38, 40, and 42 to the link 20. There they are sensed by the X' force transducer 62 and after suitable compensation for inertial and gravitational force acting on the wrist are input to the actuator 33 for pivoting the link 20 and in turn moving the gun with power assistance in either an up or a down direction depending on whether the X'-directed force was upwardly or downwardly directed. If the manual programming force applied to the gun handle 58c is in the Z' direction, the manual force is transmitted by the wrist 14 to the link 20, tending to axially stress the link 20. This axial stress is sensed by the Z' force transducer 66, and after suitable compensation for gravitational and inertial force effects produced by the wrist, is applied to the actuator 28 which pivots the link 18 either up or down to move the gun in or out, depending on whether the manual programming force on the handle 58 was inwardly or outwardly directed along the Z' axis. If the manual programming force applied to the handle 58c is in the Y' direction, a Y'-directed programming force is transmitted to the link 20 via the wrist 14 where it is sensed by the Y' transducer 64. The output of the Y' transducer, after compensation for inertial force effects of the wrist 14, is input to the actuator 22 which pivots the pedestal 16 around its longitudinal axis to impart lateral movement to the gun in one direction or the other along the Y' axis depending upon the direction of the manual programming force.

A unique aspect of this invention is that manual programming force components applied to the gun handle 58c in the X', Y', and Z' directions are sensed by force transducers, rather than torque transducers, yet the output of the force transducers controls rotary actuators which apply torques to the pedestal 16, link 18, and link 20. The torques applied by the rotary actuators 22, 28, and 33 to the pedestal 16, link 18, and link 20 rotate the pedestal 16 about its longitudinal, vertical X axis and pivot the link 18 and link 20 about horizontal axes 26 and 32 in a manner such that the gun is effectively moved linearly along the Y, Z, and X axes, respectively.

An important advantage of locating the force transducer assembly 61 inboard of the wrist 14, rather than between the gun and the outermost wrist member 42, is that the output of the force transducers 62, 64, and 66 need not be compensated for variations in orientation of the gun when the manual programming force is applied to the handle. For example, if the force transducer assembly were located between the handle 58c and the lower end (as viewed in FIG. 1) of the outermost wrist element 42, and a manual programming force applied perpendicularly to the handle in a direction parallel to the axis of the wrist member 38, the force would be sensed by the Z' or Y' transducer, or partially by both the Z' and Y' transducers, depending upon the angular position of the wrist member 42 relative to the wrist member 40. A force applied perpendicularly to the gun handle 58c in a direction parallel to wrist member 38 tends to stress the link 20 in axial direction, that is, the Z' direction. Thus, such a force should result in an output from the Z' transducer 66 and in turn an input to the actuator 28 which pivots link 18 to move the gun in or out as the case may be. With the force transducer assembly located between the handle 58c and the lower end of the wrist member 42, outputs from one or both of the Y' and Z' transducers 64 and 66, rather than the Z' transducer 66 alone, would result in improper power-assisted motion. To avoid such errors it would be necessary to introduce varying offsets into the Y' and Z' transducers 64 and 66 depending upon the angular orientation of the wrist member 42 (and the force transducers were they secured between the handle and wrist member 42) at the time the force is applied to the handle 58c in a direction perpendicular to the handle and parallel to the axis of the wrist member 38.

Upon completion of the manual programming operation, and to condition the robot for execution of the programmed sequence of motions, the position transducer outputs are disconnected from the signal recording apparatus and connected to the closed loop circuits for actuating the robot members 16, 18, 20, 38, 40, and 42 wherein they function as actual position feedback signals for the robot members. The other input to the closed loop positioning circuits for the robot members 16, 18, 20, 38, 40, and 42 is the prerecorded, desired, or programmed position of the robot members. The closed loop servo circuit for each of the six degrees of freedom operates to compare the desired position signal provided by the recording device with the actual position signal provided by the position transducer and in response thereto generate a positional error signal which is input to the actuator to position the movable robot member in the desired programmed fashion. During the program execution phase, the outputs of the X', Y', and Z' force transducers 62, 64, and 66 are connected to force level monitoring circuits. If at any time during the execution of the programmed sequence of motions the force sensed by one or more of the force transducers 62, 64, and 66 exceeds a preset safe limit, as would occur were the robot to hit an obstruction which was not present during programming, the force monitoring circuit could shut down the robot and/or provide an audible or visible alarm.

Figure 4A:
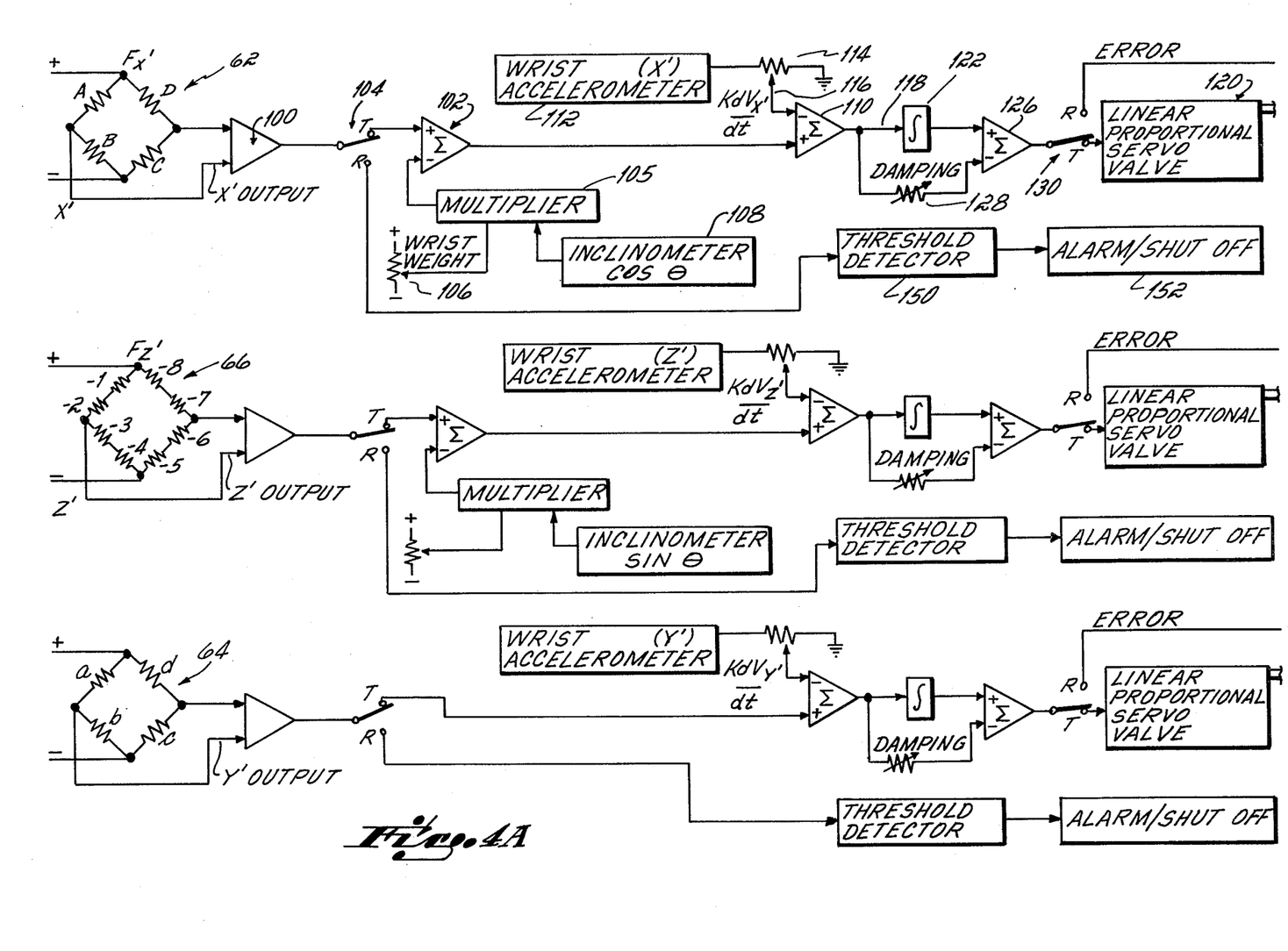
FIGS. 4a and 4b are schematic circuit diagrams of a preferred embodiment of the control circuit of this invention illustrating the circuitry utilized in both the programming mode and the execution mode.
Figure 4B:
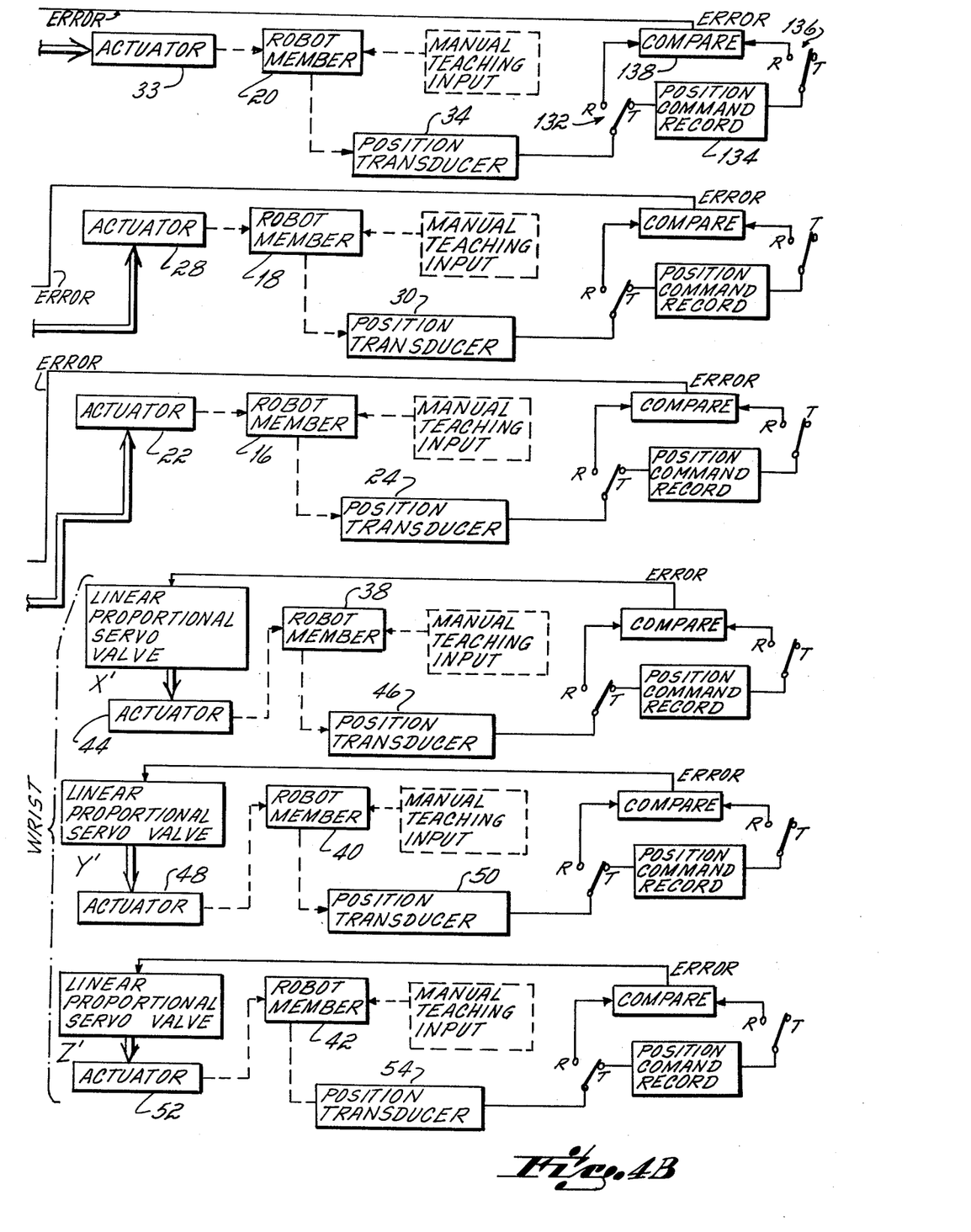

With reference to FIGS. 4a and 4b a circuit is shown in schematic block diagram format which facilitates compensating the X', Y', and Z' output components of the force transducer 61 for inertial forces applied to the link 20 by the wrist 14 due to wrist acceleration and/or gravitational forces applied to the link 20 by the wrist due to gravitational forces acting on the wrist 14. Considering this circuit in more detail, and assuming the circuit is in the teach mode, the X' output of the force transducer 62, after suitable amplification in a linear amplifier 100, is input to the positive terminal of a summing amplifier 102 via a teach/reproduce switch 104 of the single-pole/double throw type which, in the position shown, is in the teach mode. The other input to the summing amplifier 102, which is connected to the negative terminal, is from a multiplier 105 which effectively multiplies (a) a signal correlated to the weight of the wrist 14 established by a potentiometer 106 and reference voltage source and (b) a signal correlated to the instantaneous value of the cosine of the angle theta between the link 20 and the horizontal plane provided by an inclinometer 108 which in use would be mounted on the link 20. The inclinometer could be a pendulum-operated potentiometer which provides an electrical output which varies with the cosine of the angle theta. The gravitational force on the wrist 14 applied to link 20 and sensed by the X' transducer 62 varies from a maximum when the link 20 is horizontal to zero when the link 20 is vertical. The output of the summing amplifier 102 is the X' transducer output compensated for gravitational forces acting on the wrist 14.

The gravitational force compensated output from summing amplifier 102 is input to the positive terminal of a second summing amplifier 110. The other input to the summing amplifier 110 at the negative terminal, is correlated to the inertial force applied by the wrist 14 to the link 20 when the wrist accelerates or decelerates. This acceleration/deceleration correlated signal is obtained from an accelerometer 112, which in use would be mounted on the link 20, and provides an output correlated to the acceleration of the wrist in the X' direction. A voltage divider 114 is connected to the output of the wrist accelerometer 112 to facilitate weighting of the inertial correction. Depending upon the extent the signal from the accelerometer 114 is weighted, the apparent mass of the wrist can be varied during manual programming. It can be either increased to make the wrist appear more massive than it actually is, or decreased to make it appear less massive. The output of the voltage divider 114 is input on line 116 to the summing amplifier 110. The output of the summing amplifier 110 on line 118, during manual programming, constitutes the output of the X' force transducer 62 compensated for both gravitational forces applied by the wrist 14 to link 20 and inertial forces applied to the link 20 by acceleration of the wrist.

The doubly compensated output on line 118 from the summing amplifier 110 is input to a linear proportional servo valve 120 via an integrator 122. The integrator 122 assures that the hydraulic flow output from the linear proportional servo valve 120, which could be a Moog ® Series 62 valve, will increase at a constant rate when the electrical input thereto is maintained at a constant value. This, in turn, assures that the actuator 34 will accelerate the wrist 14 in the X' direction at a uniform rate when the inertial and gravitational force compensated signal on line 118 is at a constant value. In this manner the link 20 will move under power assistance in the X' direction during the teaching mode in much the same manner as any suspended body would move in the X' direction when a manual force is applied to it having an X' direction component, i.e., accelerate at a constant rate when subjected to a constant manual force. If an integrating servo valve is used, the integrator 122 can be eliminated.

If desired, and as shown in FIGS. 4a and 4b, a portion of the output signal on line 118 may be subtracted, to facilitate damping, using a summing amplifier 126. A variable resistor 128 connected in series in the damping circuit path may be provided to facilitate damping to selectively variable degrees.

A teach/reproduce switch 130 similar in structure and function to the teach/reproduce switch 104 is connected between the summing amplifier 126 and the linear proportional servo valve 120. In the teach mode terminal T is connected via the switch to the input of the linear proportional servo valve 120. The hydraulic output of the linear proportional servo valve 120 is input to the actuator 33 which drives the robot member 20 in the X' direction when a manual programming force is applied to the handle 58c of the spray gun having a component in the X' direction sensed by the X' force transducer 62. Thus, a manual programming force applied to the gun handle 58c, indicated schematically by the arrow labeled "Manual Teaching Input", results in power-assisted motion of the gun 58.

The output of the X' position transducer 34 is input via a teach/reproduce switch 132 to a recording unit 134 where it is retained for use as sequential position command signals for link 20 when the system is placed in the reproduce mode. In the reproduce mode all teach/reproduce switches 104, 130, 132, and 136 are placed in the reproduce position, i.e., with their movable contacts connected to the R terminals thereof. The sequential position commands for link 20 in record unit 134 are sequentially input to a comparator 138 whereat the position commands are sequentially compared with the actual positions of the link 20 provided by the output of position transducer 34. The comparator 138 provides position error signals for link 20 which are input to the linear proportional servo valve 120 for controlling the actuator 33 to position the robot link 20 in accordance with the commands stored in the position command record unit 134.

In the reproduce mode the output of the X' force transducer 62 is input to a threshold detector 150 via the R terminal of the teach/reproduce switch 104. Should the level of the input to the threshold detector 150 exceed a preset limit associated with safe operation, for example as may occur if the robot output strikes an object, a signal is output from the threshold circuit to an alarm/shut-off device 152 which terminates robot operation.

Operation of the compensation circuit for actuator 28 associated with link 18 in the teach and reproduction modes is identical to that for the actuator 33 associated with link 20, except gravity force compensation to the output of the Z' transducer 66 is provided using an inclinometer 142 mounted on link 20 which provides an input correlated to the cosine of the angle theta between the link 20 and the horizontal plane. Operation of the compensation circuit for actuator 22 associated with link 16 is identical to that for links 18 and 20 except that the output of the Y' force transducer 64 is compensated only for inertial effects of the wrist 14 rather than for both inertial effects and gravitational effects.

Operation of the wrist actuators 46, 48, and 50 associated with links 38, 40, and 42 in the teach and reproduce modes is identical to that of the actuators 22, 28, and 33, except that during the teach mode the wrist members are not moved with power assistance, but rather only under manual force shown schematically with the dotted line arrow labeled "Manual Teaching Input".

If desired, the X', Y', and Z' outputs of the force transducers 62, 64, and 66 may be further modified or compensated to improve the "feel" of the robot during manual programming. Specifically, the amplified outputs of each of the X', Y', and Z' transducers 62, 64, and 66 may have subtracted therefrom a signal correlated to the third derivative with respect to time of the displacement of the link 20 in the X', Y', and Z' directions, respectively. For example, considering the X' transducer 62, the subtraction can be accomplished by locating in series between teach/reproduce switch 104 and the positive terminal of the summing amplifier 102 an additional summing amplifier (not shown in FIG. 4). The positive input to this latter summing amplifier is connected, during the teach mode, to the output of the linear amplifier 100, while the negative input thereof is connected to a source of signals correlated to the third derivative with respect to time of the displacement of the link 20 in the X' direction. This latter input to the negative terminal of the summing amplifier may be derived by differentiating with respect to time the output of the wrist accelerometer 112. By compensating the output of the X' force transducer 62 in the foregoing manner when the system is in the teach mode, the power assistance provided to the link 20 by the actuator 33 is compensated for non-constant acceleration, or jerk. Jerk has significant subjective effects, and is an important determinative in subjective evaluation of the "feel" of the robot during manual programming. Compensation for jerk in the manner described above enhances the "feel" of the robot during manual programming.

We claim:

1. A robot which can be manually programmed to repetitively execute a series of programmed motions, comprising:
   a base engageable with a supporting structure for supporting said robot,
   at least one relatively massive elongated link, said massive link having first and second extremities,
   first means interconnecting said base and said first extremity of said massive link for facilitating selective movement of said massive link in a first direction relative to said base to provide a first degree of freedom for said robot,
   at least one relatively lightweight elongated link having an outer end to which a device is connectable for programmed movement in a path having at least two degrees of freedom, said lightweight link also having an inner end,
   second means interconnecting said inner end of said lightweight link to said second extremity of said massive link for facilitating selective movement of said lightweight link in a second direction relative to said massive link, said second direction being different from said first direction to provide said robot with a second degree of freedom and facilitate motion thereof in two different directions,
   said lightweight link being movable relative to said massive link in said second direction without power assistance when a manual force is applied to the outer end of said lightweight link during manual programming of said robot, said massive link being relatively immovable in said first direction without power assistance in response to application of manual force to said outer end of said lightweight link during manual programming,
   a first actuator associated with said massive link for moving, when actuated, said massive link in said first direction relative to said base,
   a second actuator associated with said lightweight link for moving, when actuated, said lightweight link in said second direction, a first position transducer associated with said massive link for providing a signal correlated to the position of said massive link, a second position transducer associated with said lightweight link for providing a signal correlated to the position of said lightweight link, a force transducer mounted in series with said massive and lightweight links between said base and said second interconnecting means for sensing the force to which said massive link is subjected to said first direction by the application of a manual programming force to said outer end of said lightweight link during manual programming of said robot, said manual programming force being applied in an arbitrary direction non-coincident with either of said first or second directions, but having force components simultaneously in both said first and second directions to induce movement of said massive and lightweight links simultaneously in both said first and second directions, respectively, said force transducer providing an output signal having components correlated to (a) said manual programming force component applied to said outer end of said lightweight link in said first direction and (b) the inertial force due to acceleration of said lightweight link in said first direction, inertial force compensation circuit means for cancelling at least a portion of said component of said force transducer output signal correlated to the inertial force of said lightweight link in said first direction and providing an inertial force compensated signal to said first actuator which is correlated to the component of said manual programming force applied in said first direction for producing, during manual programming, power-assisted movement of said massive link in said first direction while said lightweight link moves unpowered in said second direction, said power-assisted motion of said massive link and unpowered motion of said lightweight link combining to move said outer end of said lightweight link in said arbitrary direction in which said manual programming force is applied, means to record the signals of said position transducers during manual programming, and means to reproduce said recorded position transducer signals and apply them to their respectively associated actuators to execute said programmed motions without manual assistance.

2. The robot of claim 1 wherein said massive link moves in substantially only a vertical plane; said force transducer output signal has a further component correlated to the gravitational force acting on said lightweight link; and said compensation circuit cancels at least a portion of said gravitational force component of said force transducer output signal, providing to said first actuator a resultant massive link powering signal which, in addition to being at least partially compensated for inertial force of said lightweight link, is also at least partially compensated for gravitational force acting on said lightweight link.

3. The robot of claim 1 wherein said first actuator includes a linear proportional servo valve and an electrical integrator for producing power-assisted acceleration of said massive link in said first direction when a manual force is applied to said outer end of said lightweight link having a force component in said first direction of constant magnitude.

4. The robot of claim 1 wherein said first and second interconnecting means provide for pivotal movement in said first and second directions, respectively, about first and second axes, respectively, which are substantially orthogonal, and wherein said force transducer senses shear force in said massive link in a direction perpendicular to (a) an imaginary radial line extending between said first and second axes and (b) a plane containing said first axis.

5. The robot of claim 1 further including means responsive to said force transducer during execution of said programmed motions for detecting abnormal forces existing in said robot.

6. A robot which can be manually programmed to respectively execute a series of programmed motions, comprising:

a base engageable with a supporting structure for supporting said robot, a relatively massive pedestal rotatably mounted to said base for rotary movement about a first fixed vertical axis, to provide said robot with a first degree of freedom, a first actuator for selectively rotating said pedestal about said first vertical axis, a first relatively massive elongated link pivotally mounted at its inner end to said pedestal for pivotal movement about a second horizontal axis in a vertical plane to provide said robot with a second degree of freedom, a second actuator for selectively pivoting said first link about its inner end relative to said pedestal about said second horizontal axis, a second relatively massive elongated link pivotally mounted at its inner end to the outer end of said first link for pivotal movement about its inner end in a vertical plane to provide said robot with a third degree of freedom, a third actuator for selectively pivoting said second link about its inner end relative to said first link, a third relatively lightweight link rotatably mounted to the outer end of said second link for rotary movement about an axis extending from said second link for providing said robot with a fourth degree of freedom, a fourth actuator for selectively rotating said third link relative to said second link, a fourth relatively lightweight link rotatably mounted to the outer end of said third link for rotary movement about an axis perpendicular to said third link for providing said robot with a fifth degree of freedom, a fifth actuator for selectively rotating said fourth link relative to said third link, a fifth relatively lightweight link rotatably mounted to the outer end of said fourth link for rotary movement about an axis perpendicular to said fourth link for providing said robot with a sixth degree of freedom, a sixth actuator for selectively rotating said fifth link relative to said fourth link, position transducers associated with each of said pedestal and links for producing signals correlated to the relative positions thereof, said lightweight links being movable relative to said massive links and pedestal without power assistance when a manual force is applied to the outer end of said fifth lightweight link during manual programming of said robot, said massive links and pedestal being relatively immovable relative to said base without power assistance in response to said manual programming force, force transducers connected in mechanical series relationship with said massive pedestal and said first and second massive links for separately measuring forces applied to the outer end of said second link via said third, fourth, and fifth links is first, second, and third directions parallel to said first fixed vertical axis, said second horizontal axis, and a third horizontal axis perpendicular to both said first and second axes, respectively, when a manual force is applied in an arbitrary direction during manual programming to the outer end of said fifth link, circuit means for compensating the output signals of said force transducers for at least a portion of the inertial forces applied to said outer end of said second link due to changing velocities of said third, fourth, and fifth links and applying inertial force compensated signals to said first, second, and third actuators correlated to the components of manual force applied to said outer end of said fifth link in said second, third, and first directions, respectively, for producing, during manual programming, power-assisted movement of said pedestal and first and second links while said lightweight links move unpowered in their respective directions of movement, said power-assisted motion and said unpowered motion combining to move said outer end of said fifth lightweight link in said arbitrary direction in which said manual force is applied during manual programming, means to record the signals of said position transducers during manual programming, and means to reproduce said recorded position transducer signals and apply them to their respectively associated actuators to execute said programmed motions without manual assistance.

7. The robot of claim 6 wherein said force transducers responsive to forces in said first and third directions have output signal components correlated to the gravitational force acting on said lightweight links, and said compensation circuit means cancels at least a portion of said gravitational force components of said force transducers in said first and third directions, providing to said third and second actuators, respectively, resultant link powering signals which, in addition to being at least partially compensated for inertial force of said lightweight links, are also at least partially compensated for gravitational force of said lightweight links.

8. A robot which can be manually programmed to repetitively execute a series of programmed motions, comprising:

a base engageable with a supporting structure for supporting said robot, a relatively massive pedestal rotatably mounted to said base for rotary movement about a first fixed vertical axis to provide said robot with a first degree of freedom, a first actuator for moving said pedestal relative to said base, a first relatively massive elongated link pivotally mounted at its inner end to said pedestal for pivotal movement about a second horizontal axis in a vertical plane to provide said robot with a second degree of freedom, a second actuator for selectively pivoting said first link about its inner end relative to said pedestal about said second horizontal axis, a second relatively massive elongated link pivotally mounted at its inner end to the outer end of said first link for pivotal movement about its inner end in a vertical plane to provide said robot with a third degree of freedom, a third actuator for selectively pivoting said second link about its inner end relative to said first link, a relatively lightweight wrist connected to the outer end of said second link and having at least one actuator and one mechanical output member constituting the robot output for providing said robot output with at least one additional degree of freedom in a given direction, said lightweight wrist being movable relative to said massive links and pedestal without power assistance when a manual force is applied to said wrist output member during manual programming thereof, said massive links and pedestal being relatively immovable relative to said base without power assistance in response to said manual programming force, position transducers associated with said pedestal, links, and wrist for providing signals correlated to the relative positions thereof, force transducers connected in mechanical series relationship with said massive pedestal and said first and second massive links for separately measuring forces applied to the outer end of said second link via said wrist in first, second, and third directions parallel to said first fixed vertical axis, said second horizontal axis, and a third horizontal axis perpendicular to both said first and second axes, respectively, when a manual force is applied in an arbitrary direction during manual programming to the output of said robot, circuit means for at least partially compensating the output signals of said force transducers for inertial forces applied to said outer end of said second link due to changing velociity of said wrist and applying inertial force compensated signals to said first, second, and third actuators correlated to the components of manual force applied to said robot output in said second, third, and first directions, respectively, for producing, during manual programming, power-assisted movement of said pedestal and first and second links while said wrist moves unpowered in said given direction of movement, said power-assisted motion and said unpowered motion combining to move said robot output in said arbitrary direction in which said manual force is applied during manual programming, means to record the signals of said position transducers during manual programming, and means to reproduce said recorded position transducer signals and apply them to their respectively associated actuators to execute said programmed motions.

9. The robot of claim 8 wherein said force transducers responsive to forces in said first and third directions have output signal components correlated to the gravitational force acting on said wrist, and said compensation circuit means at least partially cancels said gravitational force components of said force transducers in said first and third directions, providing to said third and second actuators, respectively, resultant link powering signals which, in addition to being at least partially compensated for inertial force of said wrist, are also at least compensated for gravitational force of said wrist.

10. A robot which can be manually programmed to respectively execute a series of programmed motions, comprising:

a base engageable with a supporting structure for supporting said robot, a relatively massive pedestal rotatably mounted to said base for rotary movement about a first fixed vertical axis, to provide said robot with a first degree of freedom, a first actuator for selectively rotating said pedestal about said first vertical axis, a relatively massive elongated link pivotally mounted at its inner end to said pedestal for pivotal movement about a second horizontal axis in a vertical plane to provide said robot with a second degree of freedom, a second actuator for selectively pivoting said link about its inner end relative to said pedestal about said second horizontal axis, a relatively lightweight wrist connected to the outer end of said link and having at least one actuator and one mechanical output member constituting the robot output for providing said robot output with at least one additional degree of freedom in a given direction, said lightweight wrist being movable relative to said massive link and pedestal without power assistance when a manual force is applied to said wrist output member during manual programming thereof, said massive link and pedestal being relatively immovable relative to said base without power assistance in response to said manual programming force, position transducers associated with each of said pedestal, link, and wrist for providing signals correlated to the relative positions thereof, first and second force transducers connected in mechanical series relationship with said massive pedestal and link for separately measuring forces applied to the outer end of said link via said wrist in first and second directions parallel to said first vertical axis and said second horizontal axis, respectively, when a manual force is applied in an arbitrary direction during manual programming to the output of said robot, circuit means for at least partially compensating the output signals of said first and second force transducers for inertial forces applied to said outer end of said link due to changing velocities of said wrist and for at least partially compensating the output signal of said first force transducer for gravitational force applied to said link by said wrist and applying an inertial force compensated signal to said first actuator and an inertial and gravitational force compensated signal to said second actuator correlated to components of manual force applied to said robot output in said second and first direction, respectively, for producing, during manual programming, power-assisted motion of said massive pedestal and link in their respective directions while said lightweight wrist moves unpowered in its respective direction of movement, said power-assisted and unpower-assisted movements combining to move said robot output in said arbitrary direction in which said manual force is applied during manual programming, means to record the signals of said position transducers during manual programming, means to reproduce said recorded position transducer signals and apply them to their respectively associated actuators to execute said programmed motions without manual assistance.

11. The robot of claim 6 further including means responsive to said force transducers during execution of said programmed motions for detecting abnormal forces existing in said robot.

12. The robot of claim 8 further including means responsive to said force transducers during execution of said programmed motions for detecting abnormal forces existing in said robot.

13. The robot of claim 10 further including means responsive to said force transducers during execution of said programmed motions for detecting abnormal forces existing in said robot.

14. A support assembly for a tool which can be manually controlled to position the tool in different locations by the application of manual force to the tool in the direction in which it is desired to move the tool, comprising:

a base, at least one relatively massive elongated link, said massive link having first and second extremities, first means interconnecting said base and said first extremity of said massive link for facilitating selective movement of said massive link in a first direction relative to said base to provide a first degree of freedom for said tool, at least one relatively lightweight elongated link having an outer end to which said tool is connectable for movement in a path having at least two degrees of freedom, said lightweight link also having an inner end, second means interconnecting said inner end of said lightweight link to said second extremity of said massive link for facilitating selective movement of said lightweight link in a second direction relative to said massive link, said second direction being different from said first direction to provide said tool with a second degree of freedom and facilitate motion thereof in two different directions, said lightweight link being movable relative to said massive link in said second direction without power assistance when a manual force is applied to the outer end of said lightweight link during manual control of said tool support assembly, said massive link being relatively immovable in said first direction without power assistance in response to application of manual force to said outer end of said lightweight link during manual control of said tool support assembly, an actuator associated with said massive link for moving, when actuated, said massive link in said first direction relative to said base, a force transducer mounted in series with said massive and lightweight links between said base and said second interconnecting means for sensing the force to which said massive link is subjected in said first direction by the application of a manual force to said outer end of said lightweight link during manual control of said tool support assembly, said manual force being applied in an arbitrary direction noncoincident with either of said first or second directions, but having force components simultaneously in both said first and second directions to induce movement of said massive and lightweight links simultaneously in both said first and second directions, respectively, said force transducer providing an output signal having components correlated to (a) said manual force component applied to said outer end of said lightweight link in said first direction and (b) the inertial force of said lightweight link induced by acceleration of said lightweight link in said first direction, and inertial force compensation circuit means for at least partially cancelling said component of said force transducer output signal correlated to the inertial force of said lightweight link in said first direction and providing an inertial force compensated signal to said actuator which is correlated to the component of said manual force applied in said first direction for producing, during manual control of said tool support assembly, power-assisted movement of said massive link in said first direction while said lightweight link moves unpowered in said second direction, said power-assisted motion of said massive link and unpowered motion of said lightweight link combining to move said outer end of said lightweight link in said arbitrary direction in which said manual force is applied.

15. The assembly of claim 14 wherein said massive link moves in substantially only a vertical plane, said force transducer output signal has a further component correlated to the gravitational force acting on said lightweight link; and said compensation circuit at least partially cancels said gravitational force component of said force transducer output signal, providing to said actuator a resultant massive link powering signal which, in addition to being at least partially compensated for inertial force of said lightweight link, is also at least partially compensated for gravitational force of said lightweight link.

16. The assembly of claim 14 wherein said actuator includes a linear proportional servo valve and an electrical integrator for producing power-assisted acceleration of said massive link in said first direction when a manual force is applied to said outer end of said lightweight link having a force component of constant magnitude in said first direction.

17. The assembly of claim 14 wherein said first and second interconnecting means provide for pivotal movement in said first and second directions, respectively, about first and second axes, respectively, which are substantially orthogonal, and wherein said force transducer senses shear force in said massive link in a direction perpendicular to (a) an imaginary radial line extending between said first and second axes and (b) a plane containing said first axis.

18. The robot of claim 1 wherein said output signal of said force transducer is also at least partially compensated for nonuniform acceleration of said lightweight link, said robot including compensation means for modifying said output signal of said force transducer in dependence upon the third derivative with respect to time of the displacement of said lightweight link in said first direction.

19. The robot of claim 6 wherein said output signals of said force transducers are further at least partially compensated for nonuniform acceleration of said lightweight links, said robot including compensation means for modifying said output signals of said force transducers in dependence upon the third derivative with respect to time of the displacement of said lightweight links in said first, second, and third directions.

20. The robot of claim 8 wherein said output signals of said force transducers are further at least partially compensated for nonuniform acceleration of said wrist, said robot including means for modifying said output signals of said force transducers in dependence upon the third derivative with respect to time of the displacement of said wrist in said first, second, and third directions.

21. The robot of claim 10 wherein said output signals of said force transducers are further at least partially compensated for nonuniform acceleration of said wrist, said robot including means for modifying said output signals of said force transducers in dependence upon the third derivative with respect to time of the displacement of said wrist in said first and second directions.

22. The assembly of claim 14 wherein said output signal of said force transducer is further at least partially compensated for nonuniform acceleration of said lightweight link, said assembly including means for modifying the output signal of said force transducer in dependence upon the third derivative with respect to time of the displacement of said lightweight link in said first direction.

23. A robot which can be manually programmed to repetitively execute a series of programmed motions, comprising:

a base engageable with a supporting structure for supporting said robot, at least one relatively massive elongated link, said massive link having first and second extremities, first means interconnecting said base and said first extremity of said massive link for facilitating selective movement of said massive link in a first direction relative to said base to provide a first degree of freedom for said robot, at least one relatively lightweight elongated link having an outer end to which a device is connectable for programmed movement in a path having at least two degrees of freedom, said lightweight link also having an inner end, second means interconnecting said inner end of said lightweight link to said second extremity of said massive link for facilitating selective movement of said lightweight link in a second direction relative to said massive link, said second direction being different from said first direction to provide said robot with a second degree of freedom and facilitate motion thereof in two different directions, said lightweight link being movable relative to said massive link in said secoond direction without power assistance when a manual force is applied to the outer end of said lightweight link during manual programming of said robot, said massive link being relatively immovable in said first direction without power assistance in response to application of manual force to said outer end of said lightweight link during manual programming, a first actuator associated with said massive link for moving, when actuated, said massive link in said first direction relative to said base, a second actuator associated with said lightweight link for moving, when actuated, said lightweight link in said second direction, a first position transducer associated with said massive link for providing a signal correlated to the position of said massive link, a second position transducer associated with said lightweight link for providing a signal correlated to the position of said lightweight link, a force transducer mounted in series with said massive and lightweight links between said base and said second interconnecting means for sensing the force to which said massive link is subjected in said first direction by the application of a manual programming force to said outer end of said lightweight link during manul programming of said robot, said manual programming force being applied in an arbitrary direction noncoincident with either of said first or second directions, but having force components simultaneously in both said first and second directions to induce movement of said massive and lightweight links simultaneously in both said first and second directions, respectively, said force transducer providing an output signal having components correlated to (a) said manual programming force component applied to said outer end of said lightweight link in said first direction, (b) the inertial force due to acceleration of said lightweight link in said first direction, and (c) the gravitational force acting on said lightweight link, compensation circuit means for cancelling at least a portion of said force transducer output signal and providing a compensated signal to said first actuator which is correlated to at least a second derivative with respect to time of the displacement of said lightweight link for producing, during manual programming, power-assisted movement of said massive link in said first direction while said lightweight link moves unpowered in said second direction, said power-assisted motion of said massive link and unpowered motion of said lightweight link combining to move said outer end of said lightweight link in said arbitrary direction in which said manual programming force is applied, means to record the signals of said position transducers during manual programming, and means to reproduce said recorded position transducer signals and apply them to their respectively associated actuators to execute said programmed motions without manual assistance.

* * * * *

UNITED STATES PATENT AND TRADEMARK OFFICE
CERTIFICATE OF CORRECTION

PATENT NO. : 4,283,764
DATED : August 11, 1981
INVENTOR(S) : Gerald W. Crum; Brian M. Rooney It is certified that error appears in the above—identified patent and that said Letters Patent is hereby corrected as shown below:

Col. 5, line 29, "approximates" should be --approximate--

Col. 8, line 50, "of" should be --or--

Col. 9, line 24, "direction" should be --directions--

Col. 15, line 10, "to" should be --in--

Col. 17, line 8, "is" should be --in--

Col. 18, line 42, "velociity" should be --velocity--

Col. 22, line 52, "secoond" should be --second--

Signed and Sealed this

Sixteenth Day of February 1982

[SEAL]

Attest:

Attesting Officer

GERALD J. MOSSINGHOFF

Commissioner of Patents and Trademarks